United States Patent [19]
Findell

[11] Patent Number: 5,207,900
[45] Date of Patent: May 4, 1993

[54] SPONGE AQUARIUM FILTER

[75] Inventor: Christopher L. Findell, Cibolo, Tex.

[73] Assignee: Jungle Laboratories, Cibolo, Tex.

[21] Appl. No.: 697,268

[22] Filed: May 8, 1991

[51] Int. Cl.$^5$ ............................................. A01K 63/04
[52] U.S. Cl. ................................. 210/169; 210/416.2; 119/5
[58] Field of Search ............ 210/150, 151, 169, 416.2; 119/5

[56] References Cited

U.S. PATENT DOCUMENTS 3,899,424 8/1975 Lake ..................................... 210/169

OTHER PUBLICATIONS

"The Biological Sponge" by Art Hayley; vol. 1 #1 published 1978 in Fresh Water & Marine Aquarium Magazine, pp. 33-37 & 81.

Primary Examiner—Peter Hruskoci
Assistant Examiner—Robert James Popovics
Attorney, Agent, or Firm—Donald R. Comuzzi

[57] ABSTRACT

A special, single-piece, absorbent sponge acts as the main filtering element for an aquarium filter. The present invention incorporates conventional air lines, bubble tubes and stem sockets in a unique arrangement in combination with a novel filter in the form of a contoured sponge. The surface of the sponge filter is contoured which creates large total surface area for facilitated absorption of dirt. Under magnification, the sponge filter is composed of thousands of tiny plastic rods joined together which exponentially increase total surface area. The tiny plastic rods within the expansive surface area create hundreds of thousands of "corners" which encourage habitation of microscopic protozoa. The present invention is designed for a multitude of applications including: filtration of waste products, creation of a balanced ecosystem essential for successful aquariums, establishment of filter beds, and utilization as hatcheries for brine shrimp and fry.

4 Claims, 2 Drawing Sheets

SPONGE AQUARIUM FILTER

BACKGROUND OF THE INVENTION

This invention generally relates to filters for maintaining aquariums. More particularly, but not by way of limitation, the invention is directed at a new, novel apparatus for filtering conventional aquariums which utilize a single-piece, absorbent sponge and requires no enclosure, no charcoal filter, nor any filter floss.

Presently available filters for aquariums come in two general types. The first requires an enclosure into which is packed various filtering agents such as charcoal or synthetic floss. The second general type of filter is a bottom plate (commonly referred to as an underground filter) which is placed on the bottom of an aquarium and covered with gravel so that the entire floor of the aquarium acts as a filter. Both general types of aquarium filters are difficult and cumbersome to maintain because of the difficulty in the required periodic cleaning. The first type requires removal from the aquarium, stripping of its various internal components, cleaning of these components, and then replacement of the filtering agents before reusing in the aquarium. The second type is even more difficult to clean as it requires an extensive rearrangement of the entire aquarium; the entire floor and gravel on top of it must be cleaned and then redistributed. Thus, there is a need for an aquarium filter which is of simple construction, easy to install and requires minimum maintenance.

To overcome the above problems, a third type of filter similar to the present invention has been produced (See Prior Art FIG. 5). That conventional filter consists of a core assembly including a stem socket over which is fitted a bubble tube. The core further has an opening in its center and is surrounded by a sponge. A small orifice has been placed toward the bottom of the bubble tube so that an air tube may be fitted into that tube. As air bubbles are introduced into the water contained in the bubble tube, a difference in pressure between that water and the water surrounding the sponge in created. That difference in pressure forces water through the sponge and up the bubble tube thereby trapping dirt and other particles in the sponge and returning clean water back to the aquarium.

There are two problems with the above conventional configuration. First, as shown in FIG. 5, the air tube is merely inserted into the hole at the bottom of the bubble tube and is held only by the pressure between that tube and the bubble tube. During continuous operation, the air tube in many instances will be dislodged from the bubble tube by the vibrations caused in introducing air bubbles into the bubble tube. If that occurs, all filtering of the aquarium water will cease, and if that situation goes unnoticed for any length of time, harm to the plant and animal life in the aquarium could result. Second, the uncontoured flat outer surface of the sponge provides a small surface area for the removal of dirt and other particles. This greatly diminishes the cleaning capacity of that type conventional sponge filter. Thus, the present invention provides for an aquarium filter arrangement that maximizes filtering capacity while minimizing filter malfunctions.

SUMMARY OF THE INVENTION

The present invention incorporates conventional air lines, bubble tubes and stem sockets in a unique arrangement in combination with a novel filter in the form of a contoured sponge. The sponge member is a single-piece filter which can act as a physical sieve for unwanted waste products generated in an aquarium. The surface of the sponge filter is contoured, which creates a large total surface area for facilitated absorption of dirt. Increased surface area makes for more efficient filtration and cleaning. It will be noted by one skilled in the art that the shape of the sponge member could be modified to increase total surface area even further. The sponge traps refuse and fish waste which are then easily removed with gentle squeezing and rinsing under running water.

Ash content contained in all fish foods contribute to the requirement of constantly replacing floss and charcoal in conventional aquarium filters. This waste ash is easily removed from the present invention by simple rinsing of the sponge. Collected ash must be removed from aquariums at least monthly, and the design of the present invention facilitates this removal without having to discard and replace costly filter materials.

The air lift assembly comprises a spool shaped core with apertures about its mid-section, a tapered cross-shaped air line stem and a bubble tube. The air line stem is centered in a raised circular stem in the upper portion of the core and then fitted into an opening in the lower portion of the core. The lower portion of the core contains a weight used to secure the air assembly on the aquarium bottom The bubble tube is then fitted over the raised circular stem while an air line is fitted over the air line stem. The whole air lift assembly is then surrounded by a sponge.

The purpose of the air lift assembly is to draw aquarium water through the attached sponge and up the bubble tube and back to the aquarium by way of a venturi effect. Since the filter is run continuously, the above cycle is constant thereby providing continual cleaning of the aquarium water.

There are many advantages to this system. First, the air line stem covers the weight in the core so that there is no metal exposed to the aquatic environment. Second, the relative simplicity of design means that the present invention is less likely than competitive products to malfunction or cease to function altogether. Third, the present invention is more resistant to clogging from hard water deposits than other air lift systems because the orifice where the air enters the water is larger than those systems, and the cross-shaped air line stem breaks up much of the surface tension created as a result of the air-water contact. Last, the air lift assembly draws water through the sponge more efficiently than other air lift systems. The system of the present invention is merely twice as fast as other systems in absorbing dirt from aquarium water.

In addition to the above advantages over conventional filters, the present invention is also designed for a multitude applications for the sponge filter are outlined below and demonstrate its versatility.

A primary focus of the present invention is the facilitated and swift creation of a balanced ecosystem which is essential for successful aquarium. The surface of the sponge filter is contoured which lends to large surface area. Under magnification, the sponge filter is composed of thousands of tiny plastic rods joined together which exponentially increase total surface area. The tiny plastic rods within the expansive surface area create hundreds of thousands of "corners" which encourage habitation by microscopic protozoa.

Protozoa act as small aquatic scavengers, eating microscopic debris, which keeps water quality high and reduces the frequency of required cleanings. The protozoa turn waste into valuable plant foods around the clock, causing rich plant growth even right on top of the filter. Thus, aquarium plant life is greatly encouraged with the sponge filter. An abundance of aquatic flora enriches oxygen content of the water for the fish. In addition to eating wastes, the protozoa are themselves valuable food for the fish. Protozoa can reach optimum colony levels within three days with use of the present invention in a conventional aquarium.

Bacterial colonies in controlled numbers are also beneficial in maintaining a balanced ecosystem. The protozoa, in addition to consuming waste materials, also eat bacteria, controlling bacterial levels in the aquarium. Establishing the desired level of bacteria or "filter beds" requires relatively more time than setting up a protozoan colony. Eventually, all aquariums will develop filter beds with beneficial bacterial colonies; however, the present sponge filter can "seed" freshwater and marine tanks, establishing filter beds almost instantly. Essentially, new sponges are bubbled in an "established tank" for approximately one week. This bubbling establishes filter beds in the new sponges. Any one of these seeded sponges is now ready to establish a new filter bed in a brand new tank. The baseline bacterial flora is established almost immediately.

The present invention is also an excellent hatchery for raising brine shrimp. It removes cysts or eggshells and will not damage nor trap baby or adult brine shrimp. Furthermore, professional and amateur fish hatcheries can greatly benefit by using the present invention for breeding and rearing all types of aquarium fish. Water quality is especially important for eggs and small baby fishes (known as "fry"). Water in aquariums with the sponge magnet have lower levels of ammonia and nitrites due to the abundant population of nitrosomonas and nitrobacter bacteria in the sponge which is very important for raising fry. The contoured surface of the sponge filter elevates certain portions to give excellent hiding places for the fry, and the filtration through the unenclosed, unsupported sponge prevents trapping or damage within the filter as with other types of filtration.

The sponge filter can be used in a bare tank without the need for gravel or it can be placed unobtrusively on top of gravel in either freshwater or saltwater aquariums. The weight of absorbed water in the sponge combined with a weighted core are sufficient to anchor the filter at the bottom of the aquarium.

Another feature of the present invention is that it can be used in quarantine tanks as this filter is the only type currently known which will neither alter nor remove medications which are needed to the aquarium. Ordinarily, medications for ailing fish are added to the water of the aquarium in rather precise amounts. The medication and the water in the aquarium then form a medicated solution of the required percentages. Conventional filters will gradually remove the medication from the aquarium water, diminishing the required percentage of medication in solution, until the medicine is eventually filtered out completely. The design of the present invention prevents this from occurring when the sponge filter is the sole filtering system of a quarantine tank.

The sponge filter can be used by itself or in combination, depending on the shape and size of the sponge. For established aquariums which already have well-established conventional filters, the sponge filter becomes a valuable addition to enhance the tank with any one or all of the above unique benefits, e.g., adding protozoan colonies or being used as a hatchery.

Other objects, features and advantages of the invention will become evident in light of the following detailed description considered in conjunction with the referenced drawings of a preferred exemplary embodiment according to the present invention.

DETAILED DESCRIPTION OF THE PREFERRED EMBODIMENT

Figure 4:
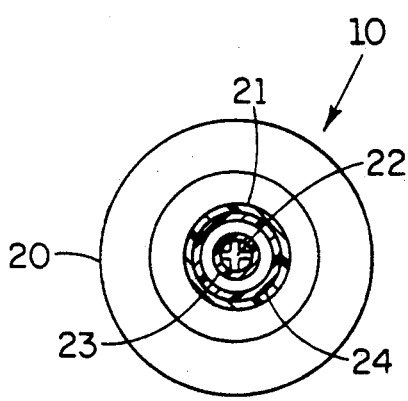
FIG. 4 shows the top view of air lift assembly 10.
Figure 3:
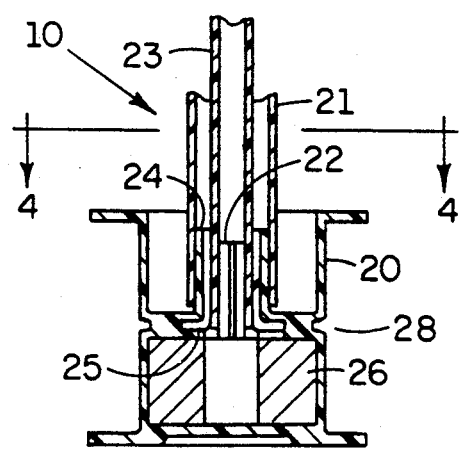
FIG. 3 shows the side view of air lift assembly 10.
Figure 5:
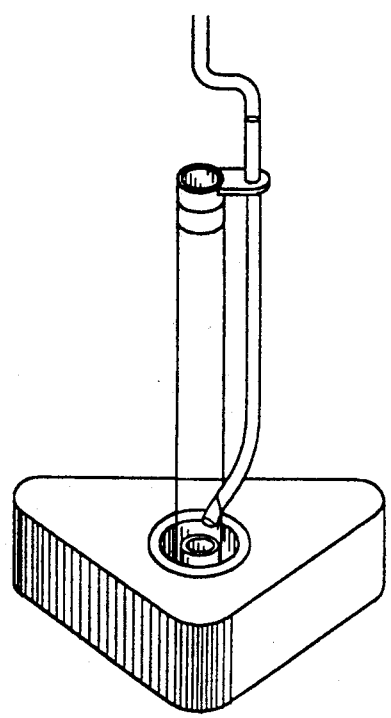
FIG. 5 shows a perspective view of a prior art sponge filter.

The present invention has four primary embodiments, all of which comprise the same basic structure. Referring to FIGS. 3 and 4, air lift assembly 10 comprises a spool shaped core 20, a bubble tube 21, a tapered cross-shaped air line stem 22 and an outer circular groove 28. Core 20 has spaced apertures 25 about its mid-section. The portion of core 20 below apertures 25 contains a weight 26 (lead in the preferred embodiment) sealed in that portion, except for an opening used to hold the base of air line stem 22. The upper portion of core 20 is recessed in its center, except for a raised circular stem 24 used to hold bubble tube 21.

Figure 2:
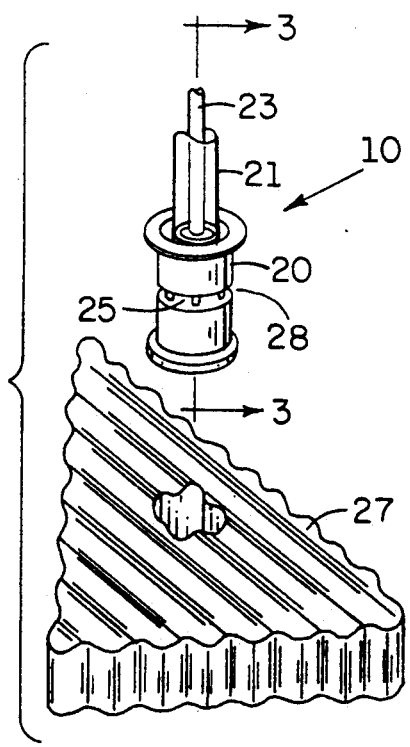
FIG. 2 shows air lift assembly 10 being fitted with sponge 27 of the preferred embodiment.

To assemble, air line stem 22 is centered inside bubble tube stem 24 and fitted into the opening in the lower portion of core 20 above weight 26. This anchors air line stem 22 to core 20 while also covering weight 26 so that there is no exposed metal to the aquatic environment. Next, bubble tube 21 is fit over bubble tube stem 24 while air line 23 is fit over air line stem 22. Air lift assembly 10 is then placed in sponge 27 (see FIG. 2) to complete filter apparatus assembly.

Sponge 27 comprises special synthetic sponge material. Microscopic examination reveals that the sponge material is comprised of thousands of tiny plastic rods which create "corners" that increase available physical and reactive surface areas a thousandfold. The sponge can be of several design shapes depending on the preferred type of embodiment. The general conformation of the sponge is a substantially flat piece which is approximately two inches thick and contains rugated corrugations in the form of surface contours which vastly increase surface area.

Figure 1:
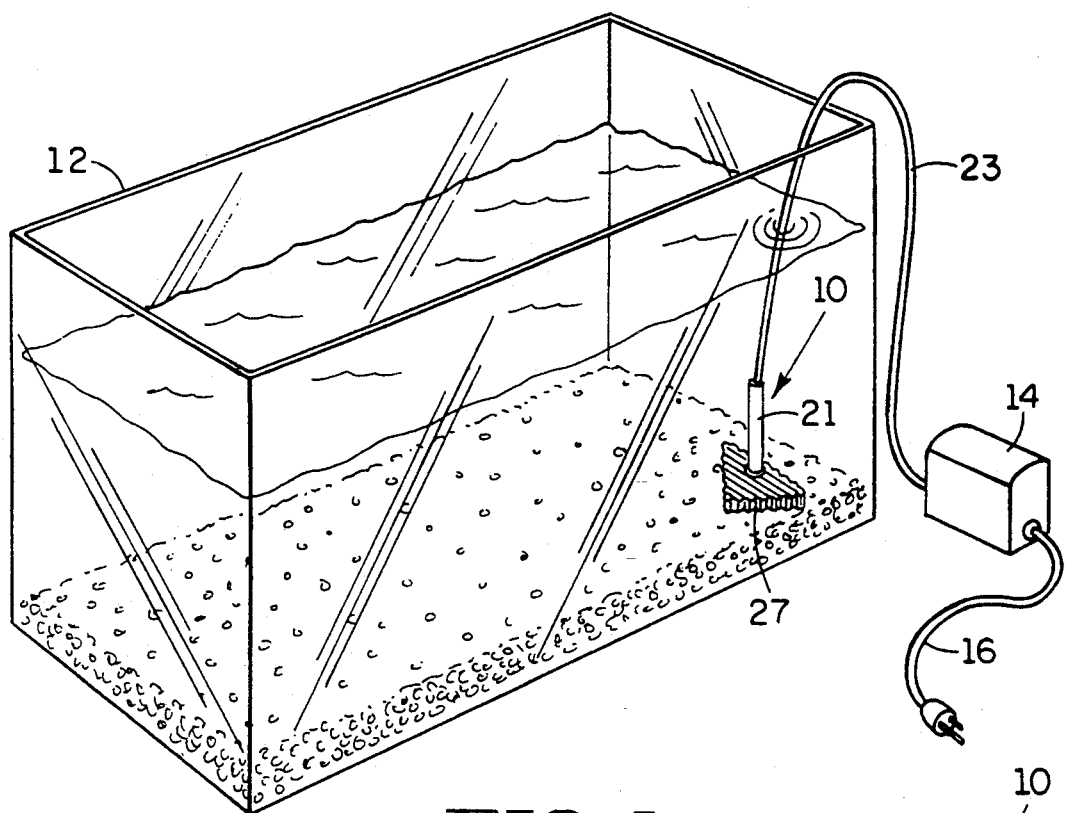
FIG. 1 shows the operational configuration of the preferred embodiment of the present invention.

Referring to FIG. 1 for system operation, air lift assembly 10 is placed in aquarium 12 and pump 14 is plugged in using electrical plug. 16. Air pump 14 introduces air into bubble tube 21 via air line 23. As air is bubbled from air line 23 into bubble tube 21, a difference in pressure is created between the water inside bubble tube 21 and that outside sponge 27 in aquarium 12. That difference in pressure forces water through sponge 27 by way of apertures 25 in core 20 into bubble tube 21 and then back into aquarium 12. As the water flows through the sponge dirt and other particles are trapped. Thus, the water returned to aquarium 12 through bubble tube 21 is clean.

The preferred embodiment has a triangle-shaped sponge and is designed to fit into the back corner, or corners if multiple filters are used, of a rectangular or square aquarium or tank. In addition to being a single-piece filter by itself, this embodiment can be used as an addition to existing conventional filters, the idea being that these additions can be used to create safe harbors for hatching fish or to generate protozoan flora that increase the benefits of a balanced ecosystem. In addition, when used to supplement conventional filtering systems, the filters of the present invention create pockets for brine shrimp which add to the available food supply for the fish. When the triangle-shaped preferred embodiment is used in pairs for the back corners of large aquariums, they have the ability to filter up to 50 gallons despite their unobtrusive nature and appearance.

A second embodiment is for smaller aquariums, Betta bowls, and squat and drum-shaped fish bowls or tanks. Thus, this embodiment has a round, circle-shaped sponge.

A third embodiment is used primarily as a hatchery for serious aquarium hobbyists and breeders. These filters are primarily designed to be functional and are less focused on aesthetic appearance. Thus, this embodiment is square and occupies a large portion of the bottom of an aquarium which has no gravel and a bare bottom. Since bare-bottom aquariums do not have filters or gravel, they ordinarily have to be siphoned at regular intervals to remove unfiltered waste. This embodiment acts as both a hatchery and a filter which can filter up to 35 gallons by itself. If two square sponges and associated filters are used, up to 70 gallons of breeding tank can be filtered.

A fourth embodiment has the sponge shaped like a four-leafed clover. This embodiment is particularly designed for goldfish tanks. Goldfish such as Koi and large Cichlids produce excessive amount of waste. The big cavitations in the four-leafed clover shape increase surface area even further to allow filtration of the excessive wastes, and a single such filter can handle up to 125 gallons even in an outdoor pond. Thus, several such filters can handle even 1,000-gallon tanks used to raise large amounts of goldfish.

Thus, the present invention is well-suited to carry out the objects and attain the ends and advantages mentioned above as well as those inherent therein. While the preferred embodiments of the present invention have been described for the purposes of this disclosure, changes in the design and arrangements of features can be made by those skilled in the art, which changes are encompassed within the spirit of this invention as defined by the appended claims.

What is claimed is:

1. An apparatus for fish aquariums comprising:
   a core structure comprised of an outer circular groove surrounding an air line stem and bubble tube stem, and means to weigh down said core structure;
   a sponge member enclosing said outer circular groove;
   an elongated bubble tube connected to said bubble tube stem; and
   an air line inserted into said bubble tube and connected to said air line stem such that air is supplied from a pump means to said air line and is transmitted via said air line stem into said bubble tube; and
   apertures in said core structure, wherein said apertures, said sponge member, and said bubble tube are constructed and arranged to force water in said aquarium through said sponge member, into said bubble tube by way of said apertures and back into said aquarium.

2. The apparatus as in claim 1 wherein said sponge member has a corrugated surface.

3. The apparatus as in claim 1 wherein said sponge member is comprised of a plurality of microscopic synthetic rods.

4. The apparatus as in claim 1 wherein said sponge member is shaped in a geometric configuration selected from the group comprising: a triangle, a circle, a rectangle, and a clover pattern.

* * * * *